United States Patent

Nayebi et al.

[11] Patent Number: 5,999,221
[45] Date of Patent: *Dec. 7, 1999

[54] HORIZONTAL SYNCHRONIZATION PULSE GENERATION CIRCUIT

[75] Inventors: Mehrdad Nayebi, Palo Alto; Duc Ngo, San Jose, both of Calif.

[73] Assignees: Sony Corporation, Tokyo, Japan; Sony Electronics, Inc., Park Ridge, N.J.

[*] Notice: This patent is subject to a terminal disclaimer.

[21] Appl. No.: 08/848,399

[22] Filed: May 8, 1997

[51] Int. Cl.$^6$ .................................................. H04N 5/06
[52] U.S. Cl. ............................................ 348/521; 348/540
[58] Field of Search ................................ 348/257, 500, 348/525, 540, 682, 678, 680, 684, 691, 692, 693, 695, 530, 521, 590, 591, 593, 598, 690, 687, 677; H04N 5/52, 5/08

[56] References Cited

U.S. PATENT DOCUMENTS

| | | | |
|---|---|---|---|
| 4,295,161 | 10/1981 | Hettiger | 358/34 |
| 4,393,412 | 7/1983 | Tatami | 358/318 |
| 4,473,839 | 9/1984 | Noda | 358/41 |
| 4,511,915 | 4/1985 | Van der Valk et al. | 348/521 |
| 4,636,836 | 1/1987 | Steckler et al. | 358/19 |
| 4,667,242 | 5/1987 | Hagino | 358/174 |
| 4,698,601 | 10/1987 | Aizawa | 331/1 A |
| 4,709,258 | 11/1987 | Salzer | 358/27 |
| 4,717,953 | 1/1988 | Chang et al. | 358/34 |
| 4,729,013 | 3/1988 | Tatami et al. | 358/19 |
| 4,802,032 | 1/1989 | Tatsuzawa et al. | 360/77.13 |
| 4,860,099 | 8/1989 | Kuwajima | 348/521 |
| 4,866,511 | 9/1989 | Belmares-Sarabia et al. | 358/27 |
| 4,891,608 | 1/1990 | Ikeda | 331/20 |
| 4,930,004 | 5/1990 | Yamamoto et al. | 358/29 |
| 4,965,669 | 10/1990 | Canfield et al. | 358/171 |
| 5,124,671 | 6/1992 | Srivastava | 331/10 |
| 5,179,450 | 1/1993 | Ando et al. | 358/312 |
| 5,182,497 | 1/1993 | Yamate et al. | 315/383 |
| 5,245,430 | 9/1993 | Nishimura | 358/149 |
| 5,256,989 | 10/1993 | Parker et al. | 331/1 A |
| 5,272,522 | 12/1993 | Lagoni | 358/30 |
| 5,278,520 | 1/1994 | Parker et al. | 331/1 A |
| 5,304,953 | 4/1994 | Heim et al. | 331/1 A |
| 5,339,114 | 8/1994 | Lagoni et al. | 348/673 |
| 5,374,900 | 12/1994 | Masumoto | 331/1 A |
| 5,448,308 | 9/1995 | Walby et al. | 348/692 |
| 5,521,647 | 5/1996 | Hyakutake | 348/521 |
| 5,534,821 | 7/1996 | Akiyama et al. | 331/8 |
| 5,638,137 | 6/1997 | Thomas | 348/673 |

FOREIGN PATENT DOCUMENTS

1633519  3/1991  WIPO ............................ H04N 5/06

*Primary Examiner*—Victor R. Kostak
*Attorney, Agent, or Firm*—Haverstock & Owens LLP

[57] ABSTRACT

A horizontal synchronization pulse generation circuit generates a horizontal synchronization pulse to be added to an encoded composite video signal. An input receiving circuit receives an encoded input video signal representing video information received from input video signals. An output video signal represents the encoded input video signal in all portions of the signal except the horizontal synchronization period. During the horizontal synchronization period a current is switched through a path resistor and used to generate the voltage level of the horizontal synchronization pulse. The voltage drop across the path resistor during the horizontal synchronization period is applied directly to the output video signal thereby generating a horizontal synchronization pulse. The current switched through the path resistor is generated by a voltage drop across a current resistor. The ratio of the path resistor to the current resistor is matched, allowing the required signal accuracy to be achieved in the voltage drop across the path resistor and generating the appropriate voltage drop across the path resistor according to the current flowing through the current resistor. The horizontal synchronization pulse generation circuit does not clamp the voltage level of the encoded input video signal, but instead generates the horizontal synchronization pulse in reference to the level of the encoded video signal.

22 Claims, 6 Drawing Sheets

HORIZONTAL SYNCHRONIZATION PULSE GENERATION CIRCUIT

FIELD OF THE INVENTION

The present invention relates to the field of encoding a video signal. More particularly, the present invention relates to the field of generating a horizontal synchronization pulse to be added to an encoded video signal.

BACKGROUND OF THE INVENTION

A composite video signal contains information which is used by a video system to generate a video picture on a display, monitor or television. Each period, within the horizontal portion of a composite video signal contains information representing one horizontal output line which is to be output on the video display, monitor or television. Each horizontal period includes a horizontal synchronization pulse, a burst signal and a video information signal. In many video transmission systems, color or chrominance information is represented by a particular phase of the chrominance subcarrier signal that is amplitude modulated with color information. The horizontal synchronization pulse is used by a phase locked loop to synchronize the system for displaying the next horizontal line of video information. The burst signal is used to synchronize the phase of the sampling pulses with the phase of the color subcarrier signal. The burst signal has a burst signal frequency equal to 3.58 MHz, which is the frequency of the chrominance subcarrier $f_{SC}$. The video information signal then comprises the chrominance subcarrier having different phases amplitude-modulated with chrominance information. The composite color video signal includes both luminance and chrominance information.

A video encoder circuit receives RGB video signals from a video source and encodes a composite video signal representing the RGB signals for transmission to other systems. In order to comply with the National Television Standards Committee (NTSC) video specifications, horizontal synchronizing pulses must be embedded in the video stream in order for the receiving systems to operate properly. These horizontal synchronizing pulses must also be set to exact levels in order to meet the NTSC specifications. A horizontal synchronization pulse is included within each horizontal period of the encoded video signal in order to allow the receiving system to synchronize to each horizontal line of video information within the encoded video signal.

The horizontal synchronization pulse is added into the encoded composite video signal before it is transmitted from the video encoder circuit. Typical prior art video encoder circuits generate exact horizontal synchronization pulse levels by first clamping the encoded video signal to a precise reference voltage level. Accordingly, during the time period when the horizontal synchronization pulse is to be added, the voltage of the composite video signal is exactly known by the system. A switching circuit is then used to switch to a steady, precise horizontal synchronization voltage level, during the horizontal synchronization time period. At the end of the horizontal synchronization time period, the switching circuit switches away from the steady, precise horizontal synchronization voltage level and back to the composite video signal. Accordingly, the resulting encoded video signal includes a horizontal synchronization pulse during the horizontal synchronization time period and the composite video signal during all other periods.

A video encoder circuit, as described above, requires the generation of two precise voltage reference levels for clamping the encoded video signal to the precise reference voltage level and for generating the horizontal synchronization pulse at the horizontal synchronization voltage level. Because of the difficulty associated with generating such precise voltage levels within an integrated circuit, external components are required to generate the necessary voltage levels. A clamping circuit is required to clamp the encoded video signal to the precise reference voltage level. A switching mechanism is also required to switch between the encoded video signal and the horizontal synchronization voltage level at the beginning of the horizontal synchronization pulse and to then switch back from the horizontal synchronization voltage level to the encoded video signal at the completion of the horizontal synchronization pulse. What is needed is a horizontal synchronization pulse generating circuit within a video encoder which does not require the clamping and switching circuitry and the generation of the precision voltage levels required by the video encoder circuits of the prior art.

SUMMARY OF THE INVENTION

A horizontal synchronization pulse generation circuit generates a horizontal synchronization pulse to be added to an encoded composite video signal. An input receiving circuit receives an encoded input video signal representing video information received from input video signals. An output video signal represents the encoded input video signal in all portions of the signal except the horizontal synchronization period. During the horizontal synchronization period a current is switched through a path resistor and used to generate the voltage level of the horizontal synchronization pulse. The voltage drop across the path resistor during the horizontal synchronization period is applied directly to the output video signal thereby generating a horizontal synchronization pulse. The current switched through the path resistor is generated by a voltage drop across a current resistor. The ratio of the path resistor to the current resistor is matched, allowing the required signal accuracy to be achieved in the voltage drop across the path resistor and generating the appropriate voltage drop across the path resistor according to the current flowing through the current resistor. The horizontal synchronization pulse generation circuit does not clamp the voltage level of the encoded input video signal, but instead generates the horizontal synchronization pulse in reference to the level of the encoded video signal.

BRIEF DESCRIPTION OF THE DRAWINGS

FIG. 2 depicts the waveforms of FIGS. 2A–2D.

FIG. 2A illustrates a waveform representing the input video signal Video In.

DETAILED DESCRIPTION OF THE PREFERRED EMBODIMENT

A horizontal synchronization pulse generation circuit generates a horizontal synchronization pulse which is added to an encoded input video signal. The horizontal synchronization pulse generation circuit receives the encoded input video signal, preferably through a buffering circuit including a transistor. An output video signal representing the encoded input video signal is generated by the horizontal synchronization pulse generation circuit. During all periods except the horizontal synchronization period, the output video signal preferably represents the encoded input video signal less a junction voltage drop across the transistor. During the horizontal synchronization period, a horizontal synchronization pulse is generated and added to the output video signal by switching a current through a path resistor and applying the voltage drop across the path resistor directly to the output video signal. Accordingly, during the horizontal synchronization period, the output video signal does not represent the encoded input video signal, but instead includes the horizontal synchronization pulse.

A differential pair of transistors is used to switch the current through the path resistor during the horizontal synchronization period to generate the horizontal synchronization pulse. The differential pair of transistors are controlled by a synchronization input signal which is active during the horizontal synchronization period. The tail current for the differential pair of transistors is generated by a current source including a current resistor. A voltage source is used to provide a predetermined voltage drop across the current resistor. During the horizontal synchronization period, the current generated by the current source flows through the path resistor, generating a voltage drop across the path resistor which is applied to the output voltage signal and pulls the voltage level of the output voltage signal down to generate the horizontal synchronization pulse. Accordingly, during the horizontal synchronization period, the output video signal is equal to the encoded input video signal less the junction voltage drop across the transistor and the voltage drop across the path resistor. After the horizontal synchronization period, the current generated by the current source does not flow through the path resistor and the output voltage signal is again equal to the encoded input voltage less the junction voltage drop across the transistor.

The ratio of the path resistor to the current resistor is matched, allowing the required signal accuracy to be achieved in the voltage drop across the path resistor, thereby creating the appropriate voltage drop across the path resistor according to the amount of current flowing through the current resistor. The level of the horizontal synchronization pulse is generated with respect to the level of the output video signal, which represents the encoded input video signal. The horizontal synchronization pulse generation circuit does not clamp the voltage level of the encoded input video signal or require precision voltage levels in order to generate the horizontal synchronization pulse. Accordingly, the horizontal synchronization pulse generation circuit of the present invention requires less circuitry and takes up less space than circuits of the prior art.

Figure 1:
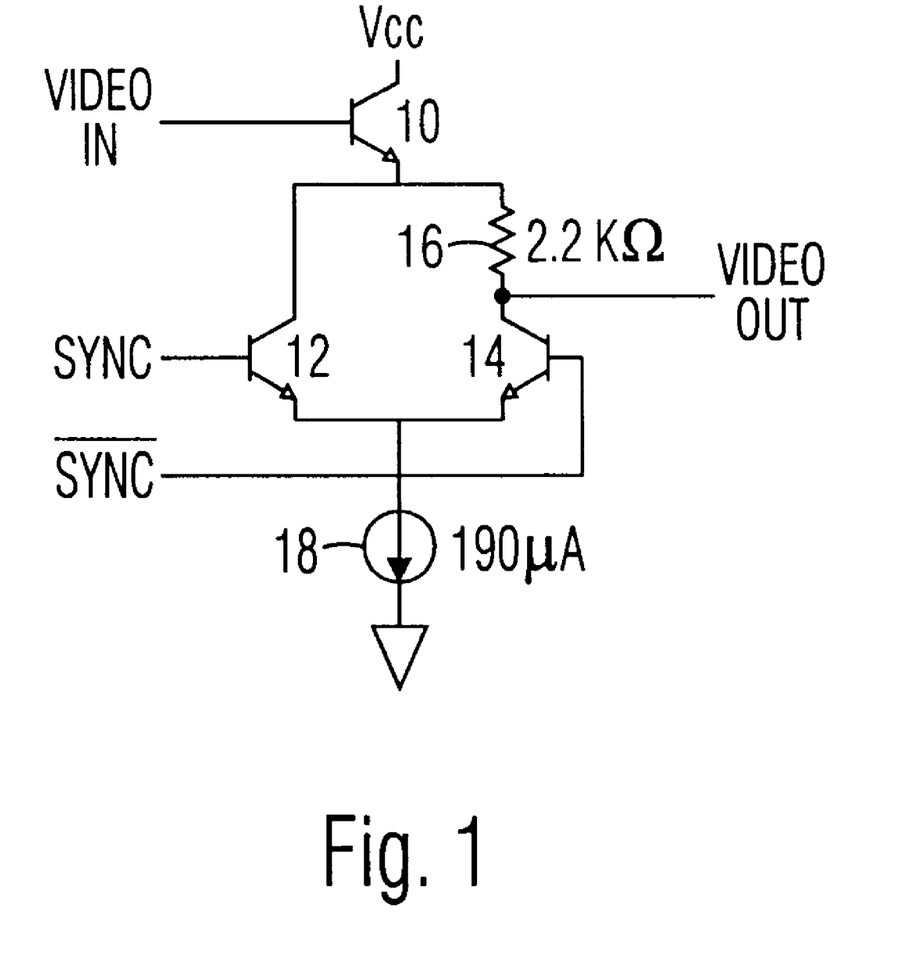
FIG. 1 illustrates a schematic diagram of a horizontal synchronization pulse generation circuit of the present invention.
Figure 4:
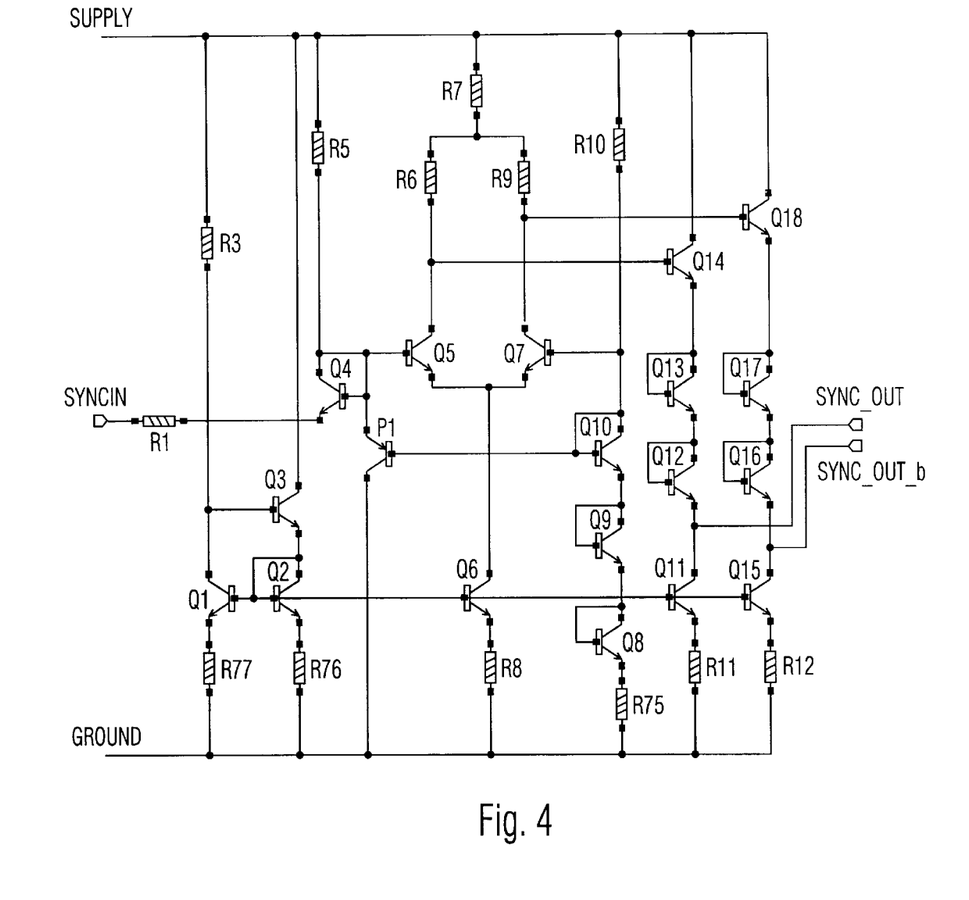
FIG. 4 illustrates a detailed schematic diagram of the synchronization buffer and level shift circuit used to generate the synchronization input signals Sync and $\overline{\text{Sync}}$.

A schematic diagram of a horizontal synchronization pulse generation circuit according to the present invention is illustrated in FIG. 1. An encoded video input signal Video In is coupled to a base of an npn transistor 10. A collector of the transistor 10 is coupled to a supply voltage VCC. A synchronization input signal Sync is coupled to a base of an npn transistor 12. The synchronization input signal Sync is preferably at a low voltage level during the horizontal synchronization period and at a high voltage level during the remaining periods of the encoded input video signal Video In. A synchronization input signal $\overline{\text{Sync}}$ is coupled to a base of an npn transistor 14. The synchronization input signal $\overline{\text{Sync}}$ is always at an opposite level to the level of the synchronization input signal Sync. Accordingly, the synchronization input signal $\overline{\text{Sync}}$ is preferably at a high voltage level during the horizontal synchronization period and at a low voltage level during the remaining periods of the encoded video input signal Video In. The synchronization input signals Sync and $\overline{\text{Sync}}$ are generated by timing circuitry, by any appropriate conventional method. Preferably, the synchronization input signals Sync and $\overline{\text{Sync}}$ are generated by the synchronization buffer and level shift circuit illustrated in FIG. 4. The synchronization input signal Syncin represents the horizontal synchronization period and is used to generate the output signals Sync_Out and Sync_Out_b, which correspond to the synchronization input signals Sync and $\overline{\text{Sync}}$, respectively.

An emitter of the transistor 10 is coupled to a collector of the transistor 12 and to a first terminal of a path resistor 16. A second terminal of the path resistor 16 is coupled to a collector of the transistor 14, thereby forming an output node from which an output signal Video Out, including a representation of the video input signal Video In and a horizontal synchronization pulse, is provided. An emitter of the transistor 12 is coupled to an emitter of the transistor 14 and to a first terminal of a current source 18. A second terminal of the current source 18 is coupled to ground or a second supply voltage. Preferably, the current source 18 sinks a current of 190 microamps and the path resistor 16 has a value of 2200 ohms.

Together, the transistors 12 and 14 form a differential pair. Accordingly, current is drawn through a selective one of the transistors 12 and 14 based on the values of the synchronization input signals Sync and $\overline{\text{Sync}}$ applied to the bases of the transistors 12 and 14, respectively. The output signal Video Out follows the encoded input video signal Video In in all portions of a horizontal period of the video signal except the horizontal synchronization portion. During the horizontal synchronization portion, a horizontal synchronization pulse is added to the output signal Video Out.

Figure 3:
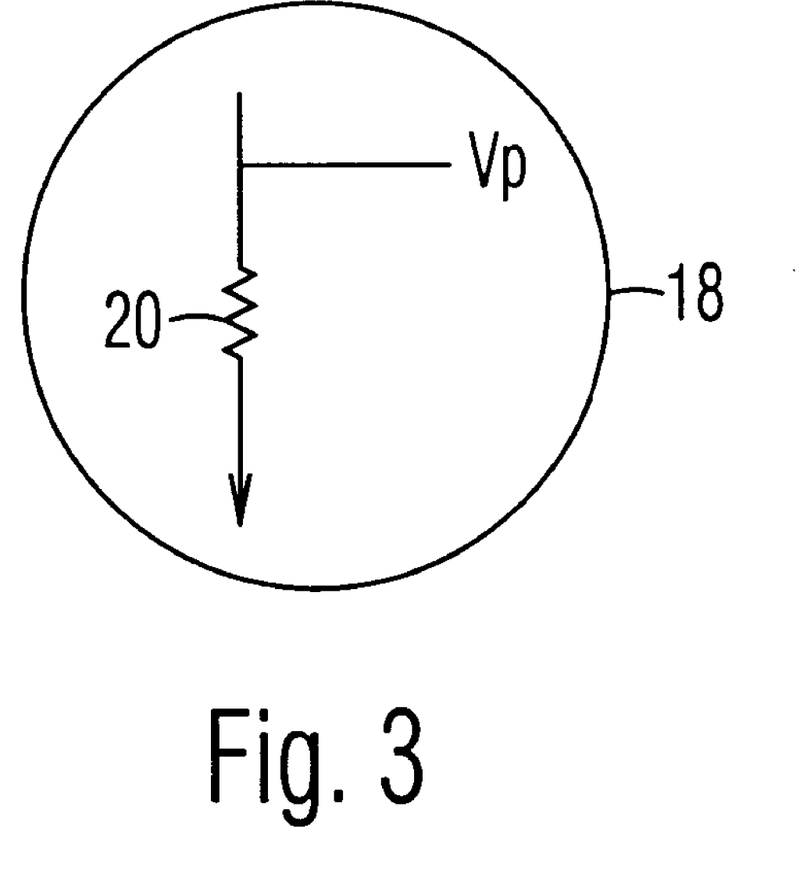
FIG. 3 illustrates a schematic diagram of the current source used within the horizontal synchronization pulse generation circuit of the present invention.

The current source 18 is generated from a voltage source Vp coupled through a resistor 20 as illustrated in FIG. 3. The voltage source Vp, has a predetermined voltage level and is coupled to a first terminal of the resistor 20, which is ultimately coupled to the emitters of the transistors 12 and 14, within the circuit of FIG. 1. A second terminal of the resistor 20 is ultimately coupled to ground within the circuit of FIG. 1. Accordingly, the difference between the voltage source Vp and ground, generates a voltage drop across the current resistor 20. This voltage drop across the current resistor 20 generates the current for the current source 18. The voltage source Vp is not required to be at a specific level and can therefore be taken from a voltage source used somewhere else within the system which includes the horizontal synchronization pulse circuit of the present invention. What must be precise is the amount of current generated by the current source 18 and the ratio of the current resistor 20 to the path resistor 16. Accordingly, as will be apparent to those skilled in the art, the value of the voltage source Vp and the value of the resistor 20 must correspond in order to generate the appropriate current level for the current source 18. Preferably, the current source 18 sinks a current equal to 190 microamps. The ratio of the current resistor 20 to the path resistor 16 is matched within the circuit in order to generate the appropriate voltage drop across the path resistor 16 during the horizontal synchronization period.

The current flowing through the current source 18 is switched on and off through the path resistor 16 to generate the required voltage drop necessary to create the horizontal synchronization pulse within the output video signal Video Out. The output node, which provides the output signal Video Out, preferably drives an amplifier input of sufficiently high impedance such that there is minimal current flow through the resistor 16 during the non-horizontal synchronization periods. However, since the same current flows through the load whether or not the horizontal synchronization pulse is applied to the output signal Video Out, the synchronization pulse levels are not affected by the current during the non-horizontal synchronization periods. The accuracy of the levels of the output signal Video Out, depends on the accuracy of the ratios of the resistors 16 and 20 and the current that is provided through the resistors 16 and 20. Because device matching is very reliable within an integrated circuit, the horizontal synchronization generation circuit of the present invention provides the necessary levels and the required signal accuracy with very little circuitry.

In all periods other than the horizontal synchronizing period, the current of the differential pair flows through the transistor 12. As discussed above, there is none or negligible current flowing through the path resistor 16 during all periods other than the horizontal synchronization period. Thus, both terminals of the path resistor 16 are at the same voltage potential. Accordingly, during periods other than the horizontal synchronization period, the voltage level of the output signal Video Out, provided from the output node, is a base-to-emitter junction voltage drop below the encoded input video signal Video In.

Figure 2A:
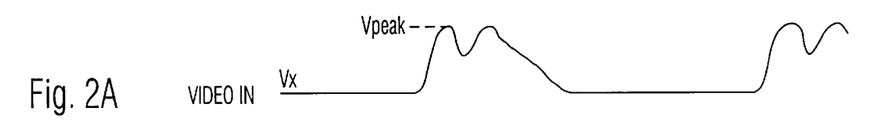
Figures 2B, 2C:
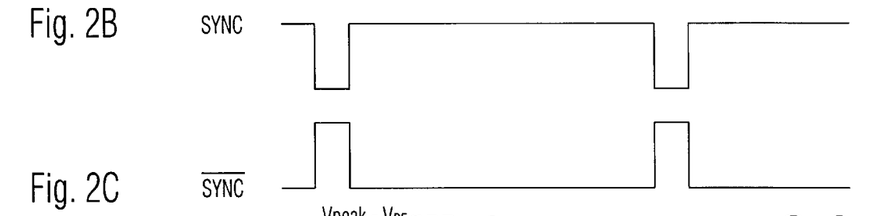
FIG. 2B illustrates a waveform representing the synchronization input signal Sync.
FIG. 2C illustrates a waveform representing the synchronization input signal $\overline{\text{Sync}}$.
Figure 2D:
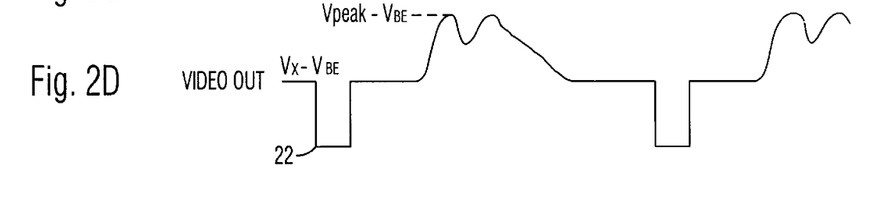
FIG. 2D illustrates a waveform representing the output video signal Video Out generated by the horizontal synchronization pulse generation circuit of the present invention.

In operation, the circuit illustrated in FIG. 1 generates the output video signal Video Out which is representative of the encoded input video signal Video In in all periods of the signal except the horizontal synchronization period. During the horizontal synchronization period, the output video signal Video Out includes a horizontal synchronization pulse. Timing diagrams showing the generated output video signal Video Out and relevant points within the horizontal synchronization generation circuit of FIG. 1 are illustrated in FIG. 2. A waveform representing the encoded input video signal Video In is illustrated in FIG. 2A. A waveform representing the synchronization input signal Sync is illustrated in FIG. 2B. A waveform representing the synchronization input signal $\overline{\text{Sync}}$ is illustrated in FIG. 2C. A waveform representing the output video signal Video Out is illustrated in FIG. 2D.

Consider the drawings of FIG. 1 and FIG. 2 together. During a horizontal synchronization period, the synchronization input signal Sync is at a low voltage level and the synchronization input signal $\overline{\text{Sync}}$ is at a high voltage level. At all other periods within the encoded input video signal Video In, the synchronization input signal Sync is at a high voltage level and the synchronization input signal $\overline{\text{Sync}}$ is at a low voltage level. At the beginning of a horizontal synchronization period, the synchronization input signal Sync falls to a low voltage level, the synchronization input signal $\overline{\text{Sync}}$ rises to a high voltage level and the current generated by the current source 18 flows through the path resistor 16 and the transistor 14. The encoded video input signal Video In less a base-to-emitter junction voltage drop across the transistor 10 is provided to the first terminal of the resistor 16. The voltage drop across the path resistor 16 due to the current is then applied to this signal and creates a drop within the output video signal Video Out to the horizontal synchronization pulse level 22. This voltage drop is accordingly taken in reference to the encoded video input signal Video In and therefore no clamping circuits are required by the horizontal synchronization pulse generation circuit of the present invention.

At the end of a horizontal synchronization period, the synchronization input signal Sync rises to a high voltage level, the synchronization input signal $\overline{\text{Sync}}$ falls to a low voltage level and the current generated by the current source 18 flows through the transistor 12. Because there is negligible or no current flowing through the path resistor 16, the output video signal Video Out follows the encoded video input signal Video In and is equal to a base-to-emitter junction voltage drop below the voltage level of the encoded video signal Video In. The output video signal Video Out follows the encoded video input signal Video In in this manner until the next horizontal synchronization period, when the synchronizing input signal Sync falls to a low voltage level and the synchronizing input signal $\overline{\text{Sync}}$ rises to a high voltage level.

Figure 5:
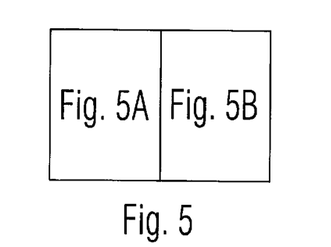
FIG. 5 illustrates a detailed schematic diagram of the horizontal synchronization pulse generation circuit of the present invention.
Figure 5A:
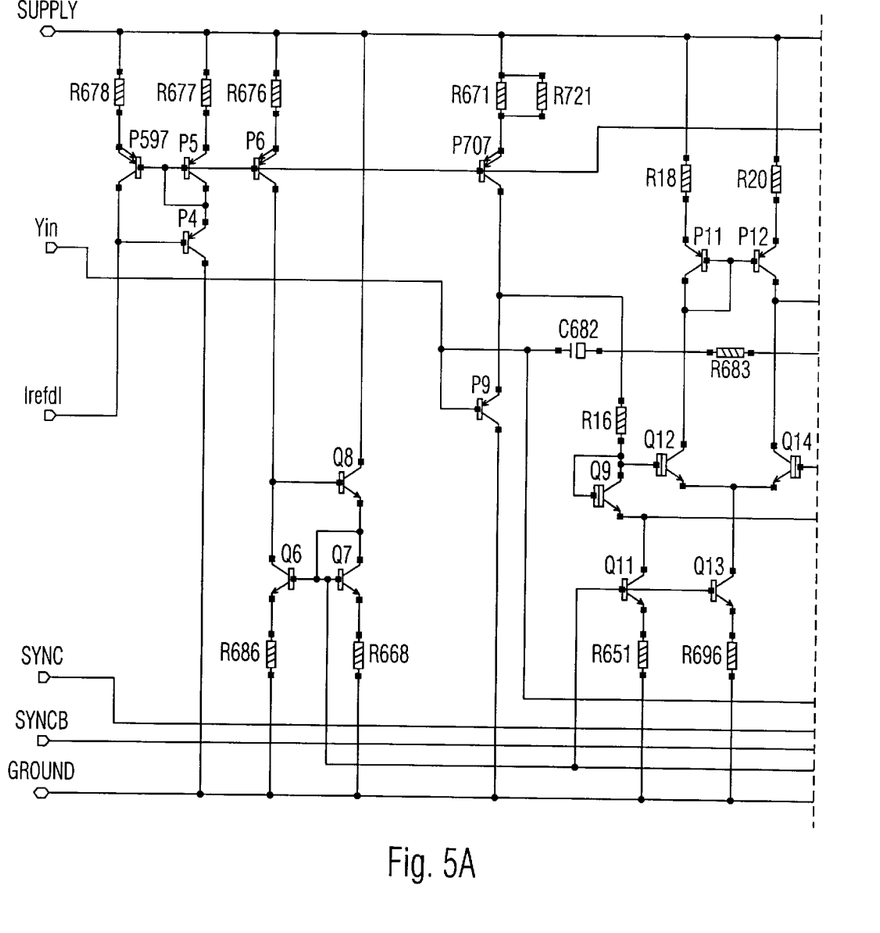
Figure 5B:
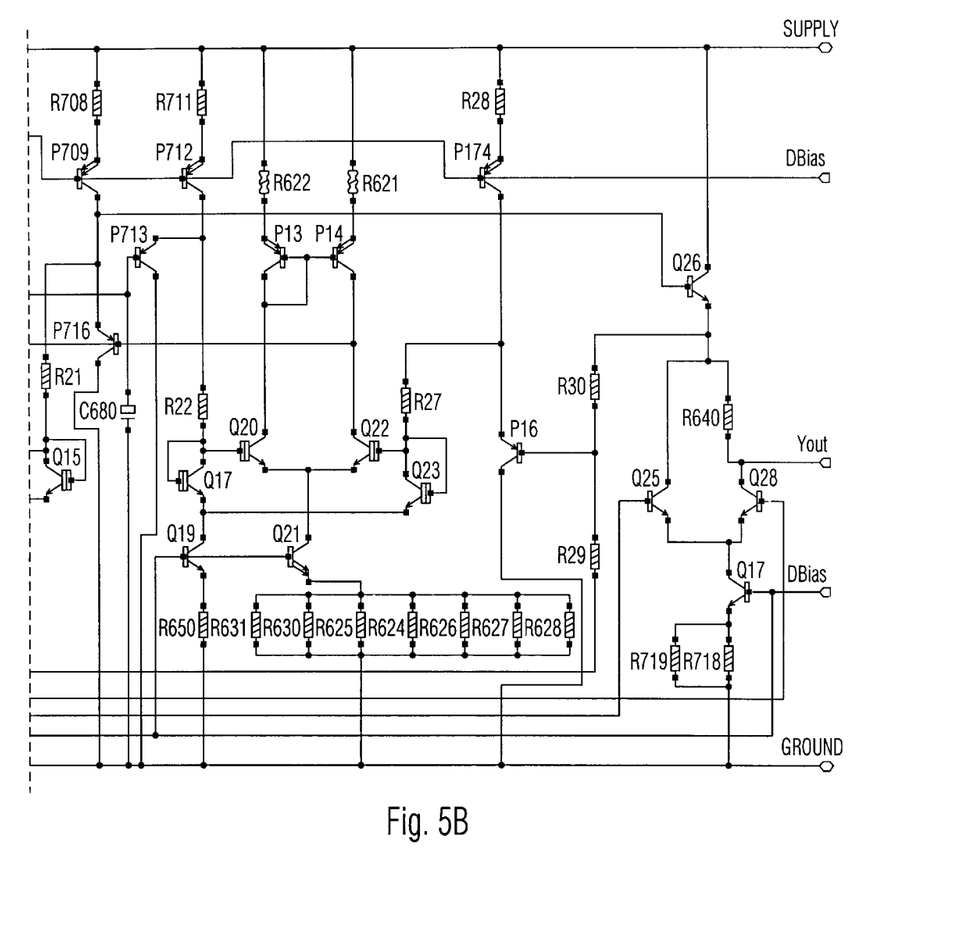

A detailed circuit schematic of the preferred embodiment of the horizontal synchronization pulse generation circuit of the present invention is illustrated in FIG. 5. The preferred embodiment of the horizontal synchronization pulse generation circuit of the present invention is implemented within an analog video encoder integrated circuit, Part No. CXA2075, which will be available from Sony Corporation of America, 3300 Zanker Road, San Jose, Calif. 95134.

While the preferred embodiment of the present invention has been illustrated and described as an integrated circuit using bipolar transistors, it will be apparent to a person of ordinary skill in the art that the circuit of the present invention may be implemented using another device technology, including but not limited to CMOS, MOS, discrete components and ECL.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

We claim:

1. A horizontal synchronization pulse generation circuit for generating a horizontal synchronization pulse during a horizontal synchronization period and adding the horizontal pulse to an encoded video signal, comprising:
   a. an input receiving circuit configured for receiving an encoded video signal;
   b. an output node for providing an output signal representing the encoded video signal;
   c. a path resistor coupled between the input receiving circuit and the output node;
   d. a current generation circuit coupled to the path resistor for selectively generating a current to flow through the path resistor; and
   e. a switching circuit coupled between the path resistor and the current generation circuit for controlling the current to selectively flow through the path resistor only during the horizontal synchronization period, thereby creating a horizontal synchronization pulse which is applied directly to the output signal.

2. The horizontal synchronization pulse generation circuit as claimed in claim 1 wherein the input receiving circuit includes a first transistor.

3. The horizontal synchronization pulse generation circuit as claimed in claim 2 wherein the output signal is equal to the encoded video signal less a junction voltage drop across the first transistor during all periods except the horizontal synchronization period.

4. The horizontal synchronization pulse generation circuit as claimed in claim 3 wherein the output signal is equal to the encoded video signal less a junction voltage drop across the first transistor and a first voltage drop across the path resistor due to the current during the horizontal synchronization period.

5. The horizontal synchronization pulse generation circuit as claimed in claim 4 wherein the switching circuit includes a differential pair of transistors controlled by a synchronization input signal, wherein the synchronization input signal is active during the horizontal synchronization period.

6. The horizontal synchronization pulse generation circuit as claimed in claim 1 wherein the current generation circuit includes a current resistor and a voltage level coupled to the current resistor for creating a second voltage drop across the current resistor and thereby generating the current.

7. A video encoder for encoding a video signal representing one or more input video signals and including a horizontal synchronizing pulse within an encoded video signal comprising:
   a. a video encoding circuit configured for receiving one or more input video signals and generating an encoded video signal representing video information within the input video signals;
   b. an output node for providing an output signal representing the encoded video signal;
   c. a path resistor coupled between the video encoding circuit and the output node;
   d. a current generation circuit coupled to the path resistor for selectively generating a current to flow through the path resistor; and
   e. a switching circuit coupled between the path resistor and the current generation circuit for controlling the current to selectively flow through the path resistor only during a horizontal synchronization period, thereby creating a horizontal synchronization pulse which is applied directly to the output signal by effecting a first voltage drop across the path resistor.

8. The video encoder as claimed in claim 7 further comprising a first transistor coupled between the video encoding circuit and the path resistor for providing the encoded video signal to the path transistor.

9. The video encoder as claimed in claim 8 wherein the output signal is equal to the encoded video signal less a junction voltage drop across the first transistor during all periods except the horizontal synchronization period.

10. The video encoder as claimed in claim 9 wherein the output signal is equal to the encoded video signal less a junction voltage drop across the first transistor and the first voltage drop across the path resistor during the horizontal synchronization period.

11. The video encoder as claimed in claim 10 wherein the switching circuit includes a differential pair of transistors controlled by a synchronization input signal, further wherein the synchronization input signal is active during the horizontal synchronization period.

12. The video encoder as claimed in claim 11 wherein the current generation circuit includes a current resistor and a voltage level coupled to the current resistor for creating a second voltage drop across the current resistor and thereby generating the current.

13. A video encoder integrated circuit for encoding a video signal representing one or more input video signals and including a horizontal synchronizing pulse within an encoded video signal, comprising:
   a. a video encoding circuit configured for receiving one or more input video signals and generating an encoded video signal representing video information within the input video signals;
   b. an output node for providing an output signal representing the encoded video signal;
   c. a buffering circuit coupled between the video encoding circuit and the output node for providing the encoded video signal;
   d. a path resistor coupled between the buffering circuit and the output node;
   e. a current source coupled to the path resistor for generating a current to flow through the path resistor; and
   f. a switching circuit coupled between the path resistor and the current source for allowing the current to flow through the path resistor only during a horizontal synchronization period, thereby creating a horizontal synchronization pulse which is applied directly to the output signal by effecting a voltage drop across the path resistor.

14. The video encoder integrated circuit as claimed in claim 13 wherein the buffering circuit includes a first transistor.

15. The video encoder integrated circuit as claimed in claim 14 wherein the output signal is equal to the encoded video signal less a junction voltage drop across the first transistor during all periods except the horizontal synchronization period.

16. The video encoder integrated circuit as claimed in claim 15 wherein the output signal is equal to the encoded video signal less a junction voltage drop across the first transistor and the first voltage drop across the path resistor during the horizontal synchronization period.

17. The video encoder integrated circuit as claimed in claim 16 where in the current source includes a current resistor and a voltage level coupled to the current resistor for creating a second voltage drop across the current resistor and thereby generating the current.

18. The video encoder integrated circuit as claimed in claim 17 wherein the switching circuit includes a differential pair of transistors controlled by a synchronization input signal, further wherein the synchronization input signal is active during the horizontal synchronization period.

19. A horizontal synchronization pulse generation circuit for generating a horizontal synchronization pulse during a horizontal synchronization period and adding the horizontal pulse to an encoded video signal, comprising:
   a. an input transistor configured for receiving an encoded video signal;
   b. an output node for providing an output signal representing the encoded video signal less a junction voltage drop across the input transistor, during all periods except a horizontal synchronization period;
   c. a path resistor coupled between the input transistor and the output node;
   d. a current source coupled to the path resistor for generating a current to flow through the path resistor; and e. a differential pair of transistors coupled between the path resistor and the current source for switching the current generated by the current source through the path resistor in order that the current flows through the path resistor only during the horizontal synchronization period, thereby creating a horizontal synchronization pulse which is applied directly to the output signal, and further wherein the output signal is equal to the encoded video signal less the junction voltage drop and a first voltage drop across the path resistor during the horizontal synchronization period.

20. The horizontal synchronization pulse generation circuit as claimed in claim 19 wherein the current source includes a current resistor and a voltage level coupled to the current resistor for creating a second voltage drop across the current resistor and thereby generating the current.

21. The horizontal synchronization pulse generation circuit as claimed in claim 19 wherein the differential pair is controlled by a synchronization input signal which is active during the horizontal synchronization period.

22. A horizontal synchronization pulse generation circuit for generating a horizontal synchronization pulse during a horizontal synchronization period and adding the horizontal pulse to an encoded video signal, comprising:

a. a first npn bipolar transistor having a first base, a first collector and a first emitter, wherein the first collector is coupled to a first supply voltage and the first base is coupled to receive the encoded video signal;

b. a second npn bipolar transistor having a second base, a second collector and a second emitter, wherein the second collector is coupled to the first emitter and the base is coupled to receive a synchronization input signal, wherein the synchronization input signal is active during the horizontal synchronization period;

c. a resistor having a first terminal and a second terminal, the first terminal coupled to the first emitter and the second collector;

d. a third npn bipolar transistor having a third base, a third collector and a third emitter, wherein the third collector is coupled to the second terminal thereby forming an output node and the third base is coupled to receive an inverted synchronization input signal, wherein the inverted synchronization input signal is at an inverted logical state in reference to the synchronization input signal;

e. a current source having a third terminal and a fourth terminal, the third terminal coupled to the second and third emitters and the fourth terminal coupled to ground;

wherein the output node provides an output signal representing the encoded video signal less a junction voltage drop across the input transistor, during all periods except a horizontal synchronization period and further wherein the output signal is equal to the encoded video signal less the junction voltage drop and a first voltage drop across the resistor during the horizontal synchronization period.

* * * * *

UNITED STATES PATENT AND TRADEMARK OFFICE
CERTIFICATE OF CORRECTION

PATENT NO. : 5,999,221
DATED : December 7, 1999
INVENTOR(S) : Mehrdad Nayebi et al.

It is certified that error appears in the above-identified patent and that said Letters Patent is hereby correct as shown below:

On the Title Page, Item [56] References Cited - FOREIGN PATENT DOCUMENTS:
Delete "1633519    3/1991    WIPO ......................... 370/94" and replace it with
-- 1633514    3/1991    Soviet Union .............. 370/94 --

Signed and Sealed this

Twenty-seventh Day of March, 2001

*Attest:*

NICHOLAS P. GODICI

*Attesting Officer*     *Acting Director of the United States Patent and Trademark Office*